T. W. LLEWELLYN & J. J. DOYLE.
COLLAR MOLDING MACHINE.
APPLICATION FILED JUNE 26, 1913.
1,117,410.
Patented Nov. 17, 1914.
2 SHEETS—SHEET 1.
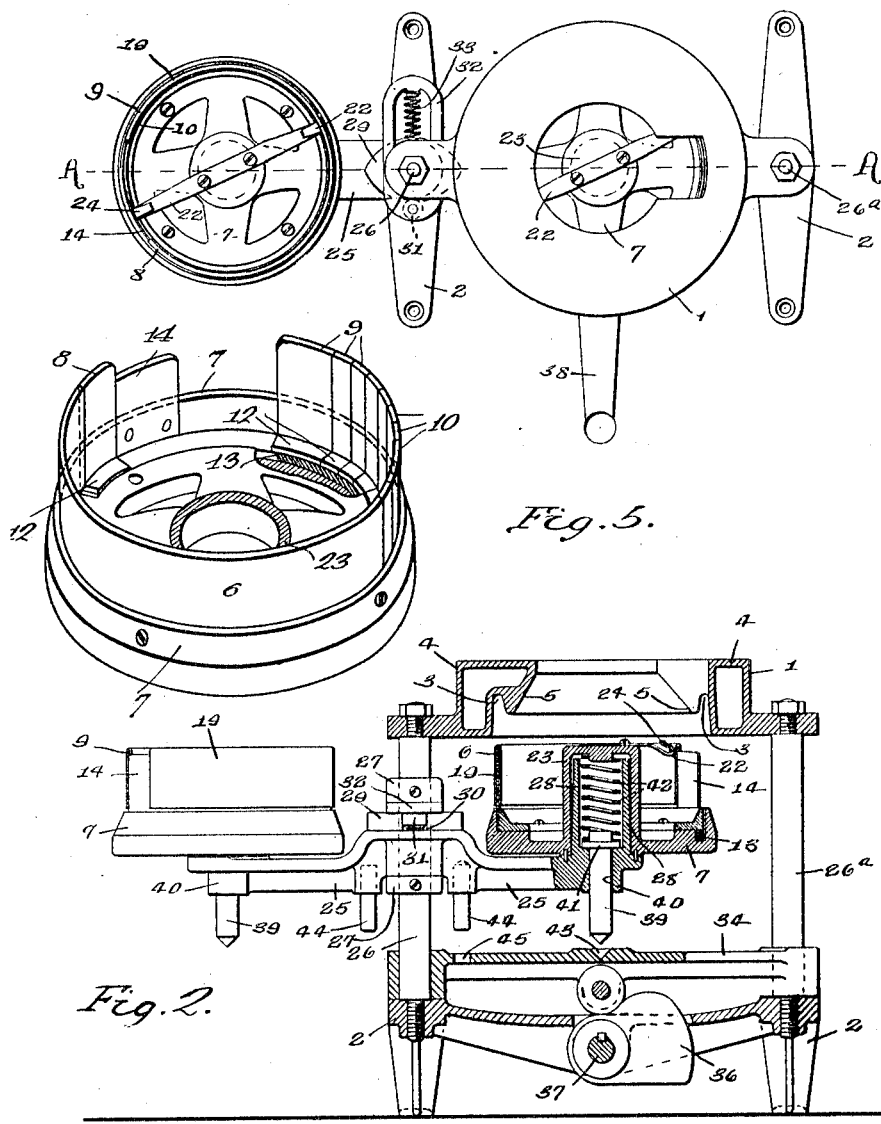

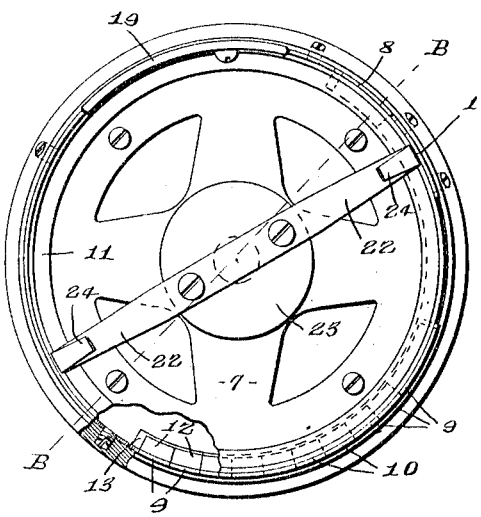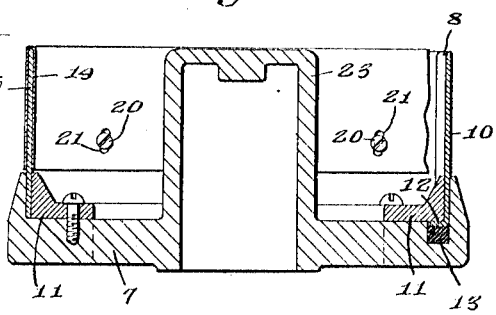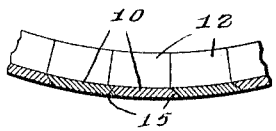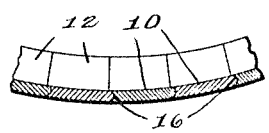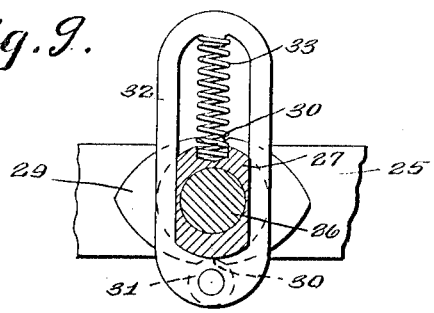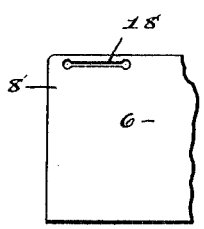

UNITED STATES PATENT OFFICE.

THOMAS W. LLEWELLYN AND JAMES J. DOYLE, OF SYRACUSE, NEW YORK.

COLLAR-MOLDING MACHINE.

1,117,410.  Specification of Letters Patent.  Patented Nov. 17, 1914.

Application filed June 26, 1913. Serial No. 775,875.

*To all whom it may concern:*

Be it known that we, THOMAS W. LLEWELLYN and JAMES J. DOYLE, citizens of the United States, and residents of Syracuse, in the county of Onondaga and State of New York, have invented a certain new and useful Collar-Molding Machine, of which the following is a specification.

This invention has for its object the production of a collar molding machine which is particularly simple in construction, economical in manufacture and highly efficient and durable in use; and the invention consists in the combinations and constructions hereinafter set forth and claimed.

In describing this invention reference is had to the accompanying drawings in which like characters designate corresponding parts in all the views.

Figure 1 is a plan of our collar molding machine, parts being omitted. Fig. 2 is a vertical sectional view, partly in elevation, on line A—A, Fig. 1. Fig. 3 is a plan view, partly broken away, of the ring and its support. Fig. 4 is a sectional view on line B—B, Fig. 3. Fig. 5 is a perspective view, partly in section, of the ring and contiguous parts. Fig. 6 is a detail view of the cam associated with the rotating carriage for the ring. Figs. 7 and 8 are fragmentary detail views of modified forms of the ring. Fig. 9 is a fragmentary view illustrating a further modified form of the ring.

This collar molding machine comprises generally male and female die members as a head having an annular socket, a ring for receiving the collar, the ring and the head having relative movement one toward and from the other for interfitting the ring with the collar thereon and the socket to mold the collar, and means for effecting the relative movement of the head and ring. In the machine illustrated the head is stationary and the ring is movable into and out of registration with the head and also toward and from the head.

1 is the head which is supported in any suitable manner by the frame 2, the head having an annular molding socket 3 in its lower side and also having a jacket 4 for receiving the heating medium as steam. The head is also formed with an internal annular cam face 5 located within the socket 3 for a purpose to be presently described.

6 designates the ring as a whole, the ring being carried by a suitable support or bed 7. This ring is provided with edge portions arranged to underlie the folds in the hems near the front ends of the collar, such edge portions being depressed or depressible below the edge of the greater portion of the ring so as to provide extra space for the extra thickness of the hem. Hence the hem will not be split or cracked during the molding operation. Such edge portions are preferably normally arranged with their edges flush with the edges of the major part of the ring and are depressible when the ring 6 with the collar thereon interfits with the socket 3. There are usually a series of said edge portions on one side of the ring and a single edge portion on the other, the single edge portion and any one of the series of depressible edge portions being arranged to underlie the hems near the ends of the collar. The series of depressible edge portions adapt the ring to various sizes of collars. Usually a shield of thin yielding resilient metal is provided to cover the ring.

8 is the single edge portion and 9 designates the series of edge portions, said edge portions being preferably provided on sections 10 separable from the major part of the ring and yieldingly mounted in the support or bed 7 and yieldable in a direction parallel to the axis of the ring. The ring and its sections are secured to the support or bed 7 by means of a retaining ring 11 engaging inturned flanges 12 at the lower edges of the ring and the sections 10.

13 designates the yielding means as a strip of rubber underlying the flanges of the sections 10.

14 designates a section of the ring lower than the yielding sections or the body of the ring, the section 14 being arranged in front of the tab at one end of the collar when the collar is on the ring. The sections 10 may have straight abutting side edges or may have lapping or interfitting side edges as illustrated at 15, 16, Figs. 7 and 8 respectively, or the edge portions 8, 9 instead of being yielding sections may be formed by weakening the edge of the ring by providing the same with marginal slots as 18, Fig. 9, located near the upper edge of the ring.

19 designates the shield for covering the upper edges of the ring and sections thereof, this shield being of thin yielding metal as brass, and being thin enough so as not to interfere with the yielding action of the sections 10. The shield is secured to the ring by screws 20 passing through slots 21 in the shield. The ring is provided with means for retaining the collar thereon and preventing the same from adhering to the head 1. This means consists of spring arms 22 arranged within the ring and extending toward the inner face thereof, the spring arms being mounted on the closed upper end of a tubular axially extending boss 23 provided on the bed or support 7 and formed with an open lower end, said arms extending laterally from the boss 23 and having their free ends looped as shown at 24 for engaging the collar and for also engaging the cam face 5 in order to be pressed out of engagement with the collar during the molding operation.

There are, in this embodiment of our invention, two rings 6 carried by a carriage movable about an axis for carrying the rings into and out of alinement alternately with the head 1, the ring 6 and its support being movable relatively to the carriage.

25 is the carriage rotatably mounted on an upright shaft 26 forming part of the frame 2, the carriage being mounted between collars 27 on the shaft. The carriage is formed with diametrically disposed upright bearings 28 on which the ring supports 7 are mounted, the bearings 28 being tubular and open at their free upper ends and substantially fitting the bosses 23 of the ring supports. The carriage 25 is rotatable by hand and means are provided for actuating the carriage until one of the rings 6 is alined with the head 1 after a starting impulse has been given to the carriage, said means consisting of a double cam 29, Figs. 1 and 5, having high and low points and sockets 30 at its low points, and a spring pressed part 31 engaging the periphery of the cam and adapted to snap into one of the sockets when one of the rings 6 is in registration with the head 1. This cam 29 is mounted on the carriage 25 and is arranged coaxially therewith. The spring pressed part 31 is a roller carried by a reciprocally movable support as a yoke 32 arranged astride the upper collar 27 and movable along flattened portions on opposite sides of said collar, the roller 31 being carried on one end of the yoke and a compression spring 33 being inserted between the other end of the yoke and said upper collar 27.

Obviously, as a turning impulse is imparted to the carriage 25, if this impulse is sufficient to turn the cam 29 and force the roller 31 out of one socket 30 and to carry one of the high points of the cam 29 past the roller 31, the yoke 32 under the action of the spring 33 pressing the roller 31 against the inclined face of the cam, will complete the half rotation of the carriage 25 until the roller 31 snaps into the other socket 30.

The means for actuating the ring 6 and its support 7 toward and from the head 1 comprises a reciprocating carriage 34 having bearings 35 embracing the shaft 26 and a similar shaft 26ª on the opposite side of the machine, the carriage being actuated upwardly by means of a cam 36 on a rock shaft 37 journaled in suitable bearings in the frame and having an upwardly extending hand lever 38 at one end by which said shaft 37 is rocked. The motion of the carriage 34 is transmitted to the ring support 7 by means of a plunger and a spring inserted between the plunger and the ring support 7.

39 are plungers slidable in bearings 40 on each side of the axis of the carriage 25, each plunger having a head 41 located in one bearing 28 of the carriage 25.

42 is a compression spring located in each bearing 28 and interposed between the head 41 and the inner face of the boss 23. The lower end of each plunger 39 is tapered and fits a tapered socket 43 in the carriage 34, and the carriage 34 first moves into engagement with the plunger 39 and the motion of the plunger 39 is transmitted through the spring 42 to the ring support 7 so that as the ring 6 and its support 7 are carried upwardly with the head 41, the spring 42 yields when the collar on the ring is being compressed in the socket 3. The sections 10 underlying the hems near the ends of the collar, also yield relatively to the major part of the ring to avoid breaking the hem at the fold.

The carriages 25 and 34 are provided with interfitting means for preventing movement of the carriage 25 when the ring 6 is being fitted into the socket 3, these means comprising pins 44 arranged on opposite sides of the axis of the carriage 25 and arranged to come into alinement with a guide opening 45 provided in the carriage 34 and to enter said opening after the carriage 34 has engaged the lower end of the plunger 39.

In operation, the operator places the collar on the ring 6 which is out of alinement or registration with the head 1. The operator then gives the starting impulse to the carriage 25 carrying the ring with the collar thereon into registration with the head 1 and then operates the handle lever 38 to actuate the carriage 34.

What we claim is:

1. In a collar molding machine, the combination of a head having a socket, and a ring for receiving the collar, the head and the ring having relative movement one toward and from the other for interfitting the ring with the collar thereon and the socket to mold the collar, and the ring having depressible edge portions arranged to underlie the folds in the hems near the ends of the collar, substantially as and for the purpose described.

2. In a collar molding machine, the combination of a head having a socket and a ring for receiving the collar, the head and the ring having relative movement one toward and from the other for interfitting the ring with the collar thereon and the socket to mold the collar, and the ring having movable sections arranged to yield in a direction parallel to the axis of the ring and away from the head to compensate for the hems near the ends of the collar, substantially as and for the purpose specified.

3. In a collar molding machine, the combination of a head having a socket and a ring for receiving the collar, the head and the ring having relative movement one toward and from the other for interfitting the ring and the socket to mold the collar, and the ring having depressible edge portions spaced apart and arranged to underlie the folds in the hems near the ends of the collar, substantially as and for the purpose set forth.

4. In a collar molding machine, the combination of a head having a socket and a ring for receiving the collar, the head and the ring having relative movement one toward and from the other for interfitting the ring with the collar thereon and the socket to mold the collar, the ring having a single depressible edge portion and a series of depressible edge portions spaced apart from the single edge portion, and the single portion and one of the portions of the series being located to underlie the folds in the hems near the ends of the collar and to yield in a direction parallel to the axis of the ring to compensate for the hems at the front ends of the collar, substantially as and for the purpose described.

5. In a collar molding machine, the combination of a head having a socket, a ring for receiving the collar, and a support for the ring, the head and the ring with its support having relative movement one toward and from the other for interfitting the ring with the collar thereon and the socket to mold the collar, and the ring including sections in the form of tongues yieldingly mounted in the support and yieldable in a direction parallel to the axis of the ring to depress their upper edges below the upper edge of the ring to compensate for the hems near the front ends of the collar, substantially as and for the purpose specified.

6. In a collar molding machine, the combination of a head having a socket and a ring for receiving the collar, the head and the ring having relative movement one toward and from the other for interfitting the ring with the collar thereon and the socket to mold the collar, the ring having a single depressible edge portion and a series of depressible edge portions spaced apart from the single edge portion, and the single portion and one of the portions of the series being located to underlie the folds in the hems near the ends of the collar and to yield in a direction parallel to the axis of the ring to compensate for the hems at the front ends of the collar, and a yielding resilient shield for covering the ring, substantially as and for the purpose set forth.

7. In a collar molding machine, the combination of a head having a socket, and a ring for receiving the collar, the head and the ring with its support having relative movement one toward and from the other for interfitting the ring with the collar thereon and the socket to mold the collar, and the ring including a section yieldable beneath the edge of a contiguous portion of the ring and designed to underlie a hem of the collar, substantially as and for the purpose described.

8. In a collar molding machine, the combination of a head having a socket, and a ring for receiving the collar, the head and the ring with its support having relative movement one toward and from the other for interfitting the ring with the collar thereon and the socket to mold the collar, and the ring including a section yieldable beneath the edge of a contiguous portion of the ring and designed to underlie a hem of the collar, and a yielding resilient shield for covering the yieldable section and said contiguous portion of the ring, substantially as and for the purpose specified.

9. In a collar molding machine, the combination of a head having a socket, a ring for receiving the collar, the head and the ring having relative movement one toward and from the other for interfitting the ring with the collar thereon and the socket to mold the collar, and means for holding the collar on the ring and preventing the same from adhering to the head, the head having means for disengaging the collar holding means from the collar during the molding operation, substantially as and for the purpose set forth.

10. In a collar molding machine, the combination of a head having a socket, a ring for receiving the collar, the head and the ring having relative movement one toward and from the other for interfitting the ring with the collar thereon and the socket to mold the collar, and means for holding the collar on the ring and preventing the same from adhering to the head, said means comprising a spring arm fixed relatively to the ring, the head having means for moving the spring arm out of operative position during the molding operation, substantially as and for the purpose described.

11. In a collar molding machine, the combination of a head having a socket, a ring for receiving the collar and coacting with the socket, a support for the ring, said support having a boss projecting within the ring, a carriage for the support having a tubular bearing projecting within and supporting the boss, the carriage being movable in a direction at an angle to the axis of the ring into and out of a predetermined position relatively to the socket, and the support being movable along the tubular bearing of the carriage lengthwise of the axis of the ring, and means for moving said support along the tubular bearing of the carriage for carrying the ring into and out of position to coact with the socket, substantially as and for the purpose set forth.

12. In a collar molding machine, the combination of a head having a socket, a ring for receiving the collar and coacting with the socket, a support for the ring, said support having a boss projecting within the ring and having its end nearest the head closed and its other end open, a carriage for the support having a tubular bearing projecting within and supporting the boss, the tubular bearing of the carriage being open at its free end, the carriage being movable in a direction at an angle to the axis of the ring into and out of a predetermined position relatively to the socket, and the support being movable along the tubular bearing of the carriage lengthwise of the axis of the ring, means movable relatively to the carriage lengthwise of the axis of the ring and connected to the interior of the boss of the support, and means for engaging the former means and moving the ring and its support lengthwise of the axis of the ring, substantially as and for the purpose described.

13. In a collar molding machine, the combination of a head having a socket, a ring for supporting the collar, a support for the ring, a carriage for the ring and its support, the ring and its support being movable toward and from the head relatively to the carriage, and the support having a boss projecting axially into the ring, and the carriage having a bearing extending into the boss, a plunger slidably supported by the carriage and extending into the bearing, a compression spring located in the bearing and interposed between the plunger and the head of the boss, and means for actuating the plunger, substantially as and for the purpose set forth.

14. In a collar molding machine, the combination of a head having a socket, a ring for receiving the collar and coacting with the socket, a support for the ring, said support having a boss projecting within the ring and having its end nearest the head closed and its other end open, a carriage for the support having a tubular bearing projecting within and supporting the boss, the tubular bearing of the carriage being open at its free end, the carriage being movable in a direction at an angle to the axis of the ring into and out of a predetermined position relatively to the socket, and the support being movable along the tubular bearing of the carriage lengthwise of the axis of the ring, a spring within the tubular bearing of the carriage, one end of the spring bearing against the closed end of the boss of the support, means movable relatively to the carriage lengthwise of the axis of the ring and bearing against the other end of the spring, and means for engaging the former means and moving the ring and its support lengthwise of the axis of the ring, substantially as and for the purpose set forth.

15. In a collar molding machine, the combination of a head having a socket, a ring for receiving the collar, a carriage for the ring, the carriage being movable about an axis for carrying the ring into and out of registration with the head, and spring actuated means for moving the carriage during the final movement thereof to center the ring relatively to the head and for holding the carriage in predetermined position, substantially as and for the purpose described.

16. In a collar molding machine, the combination of a head having a socket, a ring for receiving the collar, a carriage for the ring, the carriage being movable about an axis for carrying the ring into and out of registration with the head, and means for positioning the carriage to center the ring relatively to the head, said means comprising a cam arranged coaxially with the carriage and having high and low points and a socket at its lowest point, and a spring pressed part coacting with the cam and designed to enter the socket and stop the movement of the carriage when the ring is alined with the head, substantially as and for the purpose set forth.

17. In a collar molding machine, the combination of a head having a socket, a ring for receiving the collar, a support for the ring, a carriage movable about an axis for carrying the ring and its support into and out of registration with the head, the ring and its support being movable toward and from the head relatively to the carriage, means tending to move the carriage about its axis, and to limit the rotation of the carriage when the ring is alined with the head, a reciprocating carriage movable toward and from the head and the former carriage, means for transmitting the motion of the reciprocating carriage to the ring support, the carriages having normally separated guiding means arranged to come into engagement during the movement of the reciprocating carriage toward the former carriage, substantially as and for the purpose described.

In testimony whereof, we have hereunto signed our names in the presence of two attesting witnesses, at Syracuse, the county of Onondaga, in the State of New York, this 24th day of June, 1913.

THOMAS W. LLEWELLYN.
JAMES J. DOYLE.

Witnesses:
CHAS. F. YOUNG,
S. DAVIS.

Copies of this patent may be obtained for five cents each, by addressing the "Commissioner of Patents, Washington, D. C."